United States Patent Office 3,504,595
Patented Apr. 7, 1970

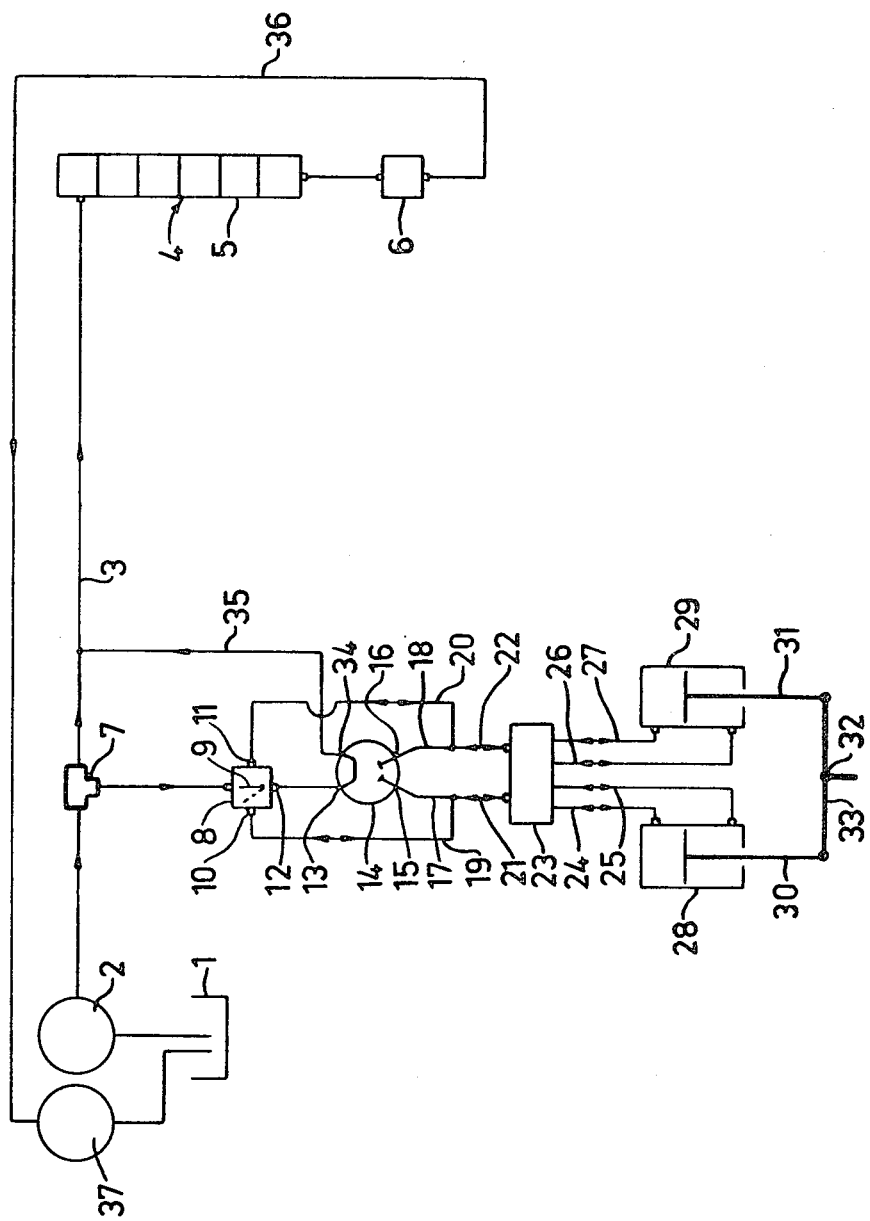

3,504,595
HYDRAULIC CONTROL DEVICE
Karl Thore Lindblom, Alfta, Sweden, assignor to Ostbergs Fabriks AB, Alfta, Sweden, a Swedish joint-stock company
Filed June 20, 1968, Ser. No. 738,681
Claims priority, application Sweden, June 22, 1967, 8,939/67
Int. Cl. F15b *13/06, 15/18;* B62d *5/00*
U.S. Cl. 91—414                       6 Claims

ABSTRACT OF THE DISCLOSURE

Hydraulic control device, as for a vehicle such as a tractor, is characterized by a "rough control" unit and a "fine control" unit, with means for rapid change therebetween.

---

This invention relates to a hydraulic control device of the type as it is defined in the introductory portion of claim 1.

The principles of the invention are primarily intended for use in the hydraulic steering of working vehicles, such as tractors. Heretofore two different standard systems have been used in this respect.

One of said systems operates with a steering control in the form of a lever-operated three-position valve. When the lever is being moved from the central position (neutral position) which represents travel straight forward (or backward), to one or the other of the outer positions, the flow from the hydraulic source actuates the hydraulic means, which operates the steering element (the front axle or, in the case of a centrally pivoted vehicle combination, the front structure proper), in one or the other direction, thereby turning the tractor into the corresponding direction. Characteristic of this system in its extraordinary rapidity of operation which is particularly advantageous in forest terrain where in many cases abrupt movements must be made for avoiding trees or fending off other obstacles. However, this system is clearly unsuitable in cases where a more precisely controlled steering is required, such as is the case in farming or road-driving.

Here is the ideal place for the second of the two systems, i.e., the wheel-operated control valve, which is adapted to actuate the hydraulic means in proportion to the turning of the wheel. It is obvious, however, that this system is not adapted to cross-forest driving, as the great and rapid wheel motions required for this purpose would be extremely tiring, if they at all could be carried out in time.

There exists, therefore, the desire that one and the same working vehicle can be controlled "roughly" and "finely," according to desire and demand. This desire is met by the control device according to the invention, in that it was given the characterizing features defined in claim 1.

The invention is described below in greater detail, with reference to the accompanying drawing wherein the only figure shows in a schematic way a control device according to the invention applied to tractor steering.

From a hydraulic source, the tank 1, the flow is fed out by a hydraulic pump 2 into a duct 3 to an auxilliary working hydraulic unit with the general designation 4 which may comprise a grip loader control 5 and a winch control 6, via a constant flow distributor 7. Said flow distributor, which is known per se, branches off a constant hydraulic flow to a three-position control 8, here called "terrain steering control," which is operated manually by a lever 9 indicated in a schematic way. The lever being in the neutral position shown (solid line), the outer position outlets shown at 10 and 11 in the control are blocked, and the flow is allowed freely to pass out through the neutral position outlet 12. This outlet communicates with the inlet 13 of a wheel-operated control valve 14, for example of the type "Orbitrol" such as control member 25 shown in FIG. 2 of U.S. Patent No. 3,249,174 to Orwig. At the respective outlet 15 and 16 of the control valve a flow is delivered which is proportional to the turning angle from the starting position. To the lines 17 and 18, respectively, of said outlets outgoing lines 19 and 20, respectively, of the control 8 are connected. The subsequently common lines 21 and 22 extend to a flow-shock damping device 23, here called "steering shock valve," of known construction, from which valve extend supply and discharge lines 24, 25 and 26, 27, respectively, for two double-acting hydraulic cylinders 28 and 29, respectively. The piston rods 30 and 31, respectively, of said cylinders act each on its end of an axle 33, which is pivotally mounted about a point 32 and forms a control member known per se for coupling the front axle or, in the case of a centrally pivoted vehicle combination, the front structure to the vehicle in question (tractor). The aforesaid flow-shock-damping device operates in the following manner:

When fluid delivered by pump 2 to (e.g.) the hydraulic jack 29 is suddenly blocked by the shaft 33 having reached its maximum displacement, the suddenly raised pressure of the fluid opens a pressure relief valve allowing the excessive flow to escape and thus preventing a shock in the hydraulic system.

The return flow from the hydraulic means 28, 29 passes via associated lines and the outlet 34 of the control valve 14 to the return line 35 of the control combination which opens into the line 3. This return flow, together with the previously unbranched flow from the pump 2, forms the inflow to the auxiliary working hydraulic unit 4 from where the hydraulic flow returns through the return line 36 of the system to the tank 1 via a filter 37.

The arrangement described above operates as follows:

The tractor first is assumed to be operated in a terrain section with obstacles, which require rapid fend-off movements. The driver then switches the lever 9 on the terrain steering control to the right or left for avoiding the obstacles. For a lever position to the left (dashed position), for example, the constant flow coming from the flow distributor 7 (for example 45 l./min., branches off from a pump flow of at maximum 91 l./min.) flows via the left-hand outlet 10 of the control 8 through the line 19 and the line 21, which is shared by the control valve 14, to the steering shock valve 23. Therefrom the flow is branched to the line 24, which opens near the upper end of the left-hand hydraulic cylinder 28, and to the line 26, which opens near the lower end of the right-hand hydraulic cylinder 29, so that the respective piston rods are driven (in the figure) downwards and upwards, respectively. The control member axle 33 mounted at point 32 then is caused to turn in anti-clockwise direction in the turning plane shown in the figure which makes the tractor rapidly to turn to the left. The flows driven out from the cylinders 28 and 29 pass via the lines 25 and 27, the steering shock valve 23, the lines 22 and 20 to the connection 11 on the control 8 and through the outlet 12 of the neutral position of the control to the nonoperative control valve 14 wherefrom they flow out into the return line 35, again into the line 3, through the auxiliary working hydraulic unit 4 and back to the tank 1 via the line 36 and the filter 37.

If the turn is utilized to its maximum degree, it first is stopped by the mechanical limiting member of the axle 33. The hydraulic shock caused thereby is taken up by the steering shock valve 23, which in principle operates as an overflow valve. The procedure is analogous when the lever 9 is switched to right-hand position, resulting in the flow path 11, 20, 22, 27 and 25, 26 and 24, 23, 21, 19, 10, 12, 13, 34 and 35.

If the tractor driver after a completed day's work or in to reach another terrain section has to drive on a narrow road or on a road travelled on, where a more accurately controlled steering is required, the driver switches the lever 9 of the terrain control 8 to neutral position (fully drawn in the figure). The constant hydraulic flow from the distributor 7 then flows via the outlet 12 of the control 8 to the wheel-operated control valve 14. Proportionally to the turning of the wheel (not shown), for example to the left, a flow is discharged through the line 21, which is shared by the terrain steering control 8, to the hydraulic cylinders 28, 29 etc. whereby exactly the same actuation of the axle 33 is obtained as at the terrain steering, the difference being that the steering now is fully controlled, i.e. the size of the turn is directly determined by the size of the wheel movement. As in the embodiment shown, where the terrain steering controls 8 is in a position "before" the control valve 14, the lever control 8 apparently dominates the steering, i.e. upon actuation positively assumes the steering function from the wheel-operated control valve 14, it possibly may be suitable to provide the terrain steering control in its neutral position with a locking device in order to prevent unintended actuation of this control when applying wheel steering.

The invention is not restricted to the embodiment shown, but different modifications are obvious to the expert within the scope of the invention. The two hydraulic cylinders 28, 29 for example, could be replaced by a single cylinder, and the steering shock valve be replaced by some other damping arrangement, if such is deemed necessary at all. The control member arrangement 32, 33 can be varied within wide limits. Furthermore, in principle, the terrain steering control 8 and the control valve 14 mutually can change their places, the inlet 13 of the control valve can be connected directly to the line from the constant flow distributor 7, and is outlet 34 deliver hydraulic flow to the terrain steering control 8, the neutral position outlet 12 of which then is in direct connection with the return line 35. In this case, however, the effectiveness of the terrain steering control becomes dependent on the setting of the wheel-operated control valve.

The arrangement of the constant flow distributor 7, which also may be adjustable to different constant values, could be replaced by two pumps, viz. one pump with constant effect for the control combination and one pump with variable effect for the auxiliary working hydraulic unit. This pump, furthermore, could be given another place in the system, for example before the constant flow distributor or, if constant flow to the auxiliary working hydraulic unit is considered desirable, after the flow distributor.

The places of the different components relative one another, as a whole, are determined by the constructional prerequisites of the working vehicle in question and by the special wishes. If desired, it would also be possible to place several terrain steering controls on different places.

Although the invention was described above in connection with a tractor (for front axle or front structure steering) with auxiliary working hydraulic unit, the principles of the inventon can be applied more generally, i.e. both on vehicles without any auxiliary working hydraulic unit and on hydraulic control arrangement in general where possibilities are desired for rapid change between rough and fine control and, respectively, rough and fine adjustment of different directions or distances.

What I claim is:

1. Hydraulic control device for rough and fine control, comprising a hydraulic means fed from a hydraulic source via a flow control device for actuation of an element to be controlled, such as the wheel steering mechanism of a vehicle, characterized in that the flow control device is composed of two units, viz. a first control, which in a known way has two distinct working positions and a neutral position and is adapted in one or the other working position to direct the flow of the hydraulic source to the hydraulic means in a direction actuating the element in one or the other direction for effecting a rough control of the element as long as the control device is set in one or the other of the working positions, and a second control which in a known way has substantially variable flow control, said second control being coupled to the first control so as in the neutral position of the latter to receive the flow of the hydraulic source for further transport to the hydraulic means and thereby to effect fine control of the element corresponding to the momentary setting of said second control.

2. Device according to claim 1, characteried in that the neutral position outlet of the first control is connected with the inlet of the second control.

3. Device according to claim 1, characterized in that in the outlet line to the hydraulic means, which is common to said two controls, a flow shock damping member is placed.

4. Device according to claim 1, characterized in that the element to be controlled comprises an axle pivotally mounted about a point, the hydraulic means comprising two hydraulic cylinders with their respective piston rods actuating the axle on opposite sides of the bearing point of the axle in a direction supporting one another.

5. Device according to claim 1, characterized in that to the hydraulic source also is connected an auxiliary working hydraulic unit, a control member being provided to maintain the flow feed to the combination formed by the two controls at a substantially constant value.

6. Device according to claim 5, characterized in that said control member is a constant flow distributor placed in the way of the hydraulic flow from the source to the auxiliary working hydraulic unit for branching off a substantially constant flow to the control combination.

References Cited

UNITED STATES PATENTS

| | | |
|---|---|---|
| 1,890,010 | 12/1932 | Vickers. |
| 2,403,325 | 7/1946 | Armington. |
| 3,249,174 | 5/1966 | Orwig. |
| 3,360,925 | 1/1968 | Zimmerman. |

EDGAR W. GEOGHEGAN, Primary Examiner

U.S. Cl. X.R.

60—52, 97; 91—448; 180—79.2